Patented Mar. 24, 1925.

1,531,262

UNITED STATES PATENT OFFICE.

ARTHUR HUGH DAVIES, DECEASED, LATE OF WILLENHALL, ENGLAND; BY MARY OLIVIA DAVIES, ADMINISTRATRIX, OF WILLENHALL, ENGLAND; AND ROBERT FRASER THOMSON, OF CARLISLE, ENGLAND, ASSIGNORS TO SCOTTISH DYES, LIMITED, OF CARLISLE, CUMBERLAND COUNTY, ENGLAND.

PRODUCTION OF COLORING MATTERS.

No Drawing. Original application filed November 14, 1921, Serial No. 515,087. Divided and this application filed August 24, 1923. Serial No. 659,233.

*To all whom it may concern:*

Be it known that we, MARY OLIVIA DAVIES, administratrix of the estate of the late ARTHUR HUGH DAVIES, a subject of the King of Great Britain and Ireland, and residing at 72 New Road, Willenhall, in the county of Stafford, England, and ROBERT FRASER THOMSON, a subject of the King of Great Britain and Ireland, and residing at Murrell Hill Works, Carlisle, in the county of Cumberland, England, do hereby declare that the said ARTHUR HUGH DAVIES, deceased, and ROBERT FRASER THOMSON have invented certain new and useful Improvements in the Production of Coloring Matters, of which the following is a specification.

This invention relates to the production of a coloring matter or dyestuff of the anthracene series.

It has for its object to provide an improved or new coloring matter from the known oxidation product of dibenzanthrone.

The invention consists in the production of a coloring matter by the methylation of the oxidation product of dibenzanthrone, preferably by dimethyl sulphate.

The following examples are given to illustrate methods of carrying the invention into effect:—

Example "A."

Ten parts of the dried oxidation product of dibenzanthrone are suspended in one hundred parts of dry nitrobenzene and ten parts of dry sodium carbonate added along with ten parts of dimethyl sulphate. A rise in temperature occurs and the mixture is then heated to boiling for three hours, cooled and 10 parts of sodium carbonate dissolved in 200 parts of water added, and the nitrobenzene distilled off by means of steam. The product is filtered off and may be used direct as a dyestuff paste. It consists of a blue-green paste, which dissolves in alkaline hydrosulphite with a blue colour and dyes cotton bright greenish-blue shades, which shades are fast to the action of chlorine and acids. The dry product dissolves in sulphuric acid with a red-violet colour which is unaltered by addition of a reducing agent such as metallic copper.

Example "B."

The methylated dyestuff described in Example "A" may be separated in a pure form by the following method:—

The nitrobenzene solution obtained at the end of the alkylation is filtered while still hot, yielding a greenish-blue filtrate. The undissolved residue is extracted with boiling nitrobenzene until no more dyestuff dissolves, the solution being then filtered and the combined filtrates evaporated to a small bulk and allowed to cool. The dyestuff crystallizes out and is filtered off and washed with alcohol. The product consists of a brilliant greenish-blue powder dissolving in strong sulphuric acid with a brilliant red-violet colour, which on slow dilution with water becomes first brown, owing to the formation of the sulphuric acid compound, and finally brilliant bluish-green. The dyestuff may be used in the form of a powder or may be converted into paste by dissolving in strong sulphuric acid and reprecipitating with water, or by dissolving in alkaline hydrosulphite and blowing the dyestuff out again with air.

The product appears to be dimethoxydibenzanthrone which may be regarded as formed by the combination of one molecule of dibenzanthrone, two molecules of methyl sulphate and one molecule of sodium carbonate according to the following equation:—

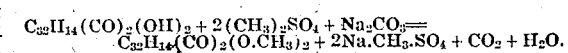

An approximate analysis of the dyestuff gives the following results:—

|   | Per cent. |
|---|---|
| $(O.CH_3)$ | 11.5 |
| C | 83.5 |
| H | 4.8 |

By calculation the theoretical equivalents in dimethoxydibenzanthrone are as follows:—

|  | Per cent. |
|---|---|
| (O.CH$_3$) | 12.0 |
| C | 83.7 |
| H | 3.9 |

These figures therefore show a close resemblance particularly having regard to the fact that only the results of an approximate analysis are given.

Example "C."

The crude methylated dyestuff obtained in Example "A" may be purified by suspending 1 part in 10 parts of water, adding ¼ part of sodium chlorate, bringing to the boil, and adding slowly 3 parts of commercial hydrochloric acid. The mixture is then boiled for 1 hour, diluted and filtered. The impurities in the original product are now present in the form of alkali soluble bodies and may be removed by dissolving in weak alkali and filtering. The purified body consists of a green paste which may be used directly as a dyestuff and is in all respects identical with the product described in Example "B."

Example "D".

The methylated dyestuff described in Example "A" forms a compound by combination with sulphuric acid, which compound may be used for purifying and isolating the colour.

1 part of methylated product is dissolved with stirring in 25 parts of 96% sulphuric acid. To this, water is cautiously added to reduce the concentration of sulphuric acid to 80%. The sulphuric acid compound separates out as a brown amorphous precipitate. This is filtered off over asbestos and washed with 80% acid, until the filtrates are no longer coloured brown. The precipitate of the sulphuric acid compound, which is of a brown colour, is boiled up with water, which converts it into a brilliant bluish-green paste, and this is then filtered off, washed with water, when it can be used directly for dyeing. The sulphuric acid filtrates contain impurities of little value.

In the above examples we have used nitrobenzol as the medium for carrying out the treatment with dimethyl sulphate but we do not confine ourselves to the use of nitrobenzol, as the reaction can be carried out quite readily in other solvents which do not interfere with the reaction, such as nitrotoluol, naphthalene. The reaction may also be carried out without a diluent in the presence of dimethyl sulphate.

Having now described our invention, what we claim as new and desire to secure by Letters Patent is:—

1. The process of producing a coloring matter which comprises the methylation of the oxidation product of dibenzanthrone.

2. The process of producing a coloring matter which comprises the methylation of the oxidation product of dibenzanthrone with dimethyl sulphate.

3. As a new article of manufacture the coloring matter obtainable by treating the oxidation product of dibenzanthrone with dimethyl sulphate which consists of a blue-green paste which dissolves in alkaline hydrosulphite with a blue colour and dyes cotton bright greenish-blue shades which are fast to the action of chlorine and acids.

4. As a new article of manufacture the coloring matter obtainable by treating the oxidation product of dibenzanthrone with dimethyl sulphate which consists when dry of a product that dissolves in sulphuric acid with a red-violet colour which is unaltered by addition of metallic copper.

5. A process for the production of a dyestuff which comprises the treatment of an oxidation product of dibenzanthrone with dimethyl sulphate followed by crystallization from a nitrobenzene solution.

6. As a new article of manufacture a purified dyestuff prepared according to the process claimed in claim 5, which consists of a brilliant greenish-blue powder dissolving in strong sulphuric acid with a brilliant red-violet colour which on slow dilution with water becomes first brown and finally brilliant bluish-green.

7. A process for the production of a coloring matter which comprises the treatment of the oxidation product of dibenzanthrone with dimethyl sulphate and subsequent combination with sulphuric acid.

8. The product of the process claimed in claim 7, which consists in a brown amorphous precipitate which when boiled with water is converted into a brilliant bluish-green substance which can be used directly for dyeing.

9. Dimethoxydibenzanthrone.

10. Materials dyed by dimethoxydibenzanthrone.

In testimony whereof we have signed our names to this specification.

MARY OLIVIA DAVIES,
*Administratrix of Arthur Hugh Davies, deceased.*
ROBERT FRASER THOMSON.